July 16, 1940.  J. B. GILBERT  2,208,156
AIRCRAFT PROPULSION
Filed May 16, 1938   2 Sheets-Sheet 1
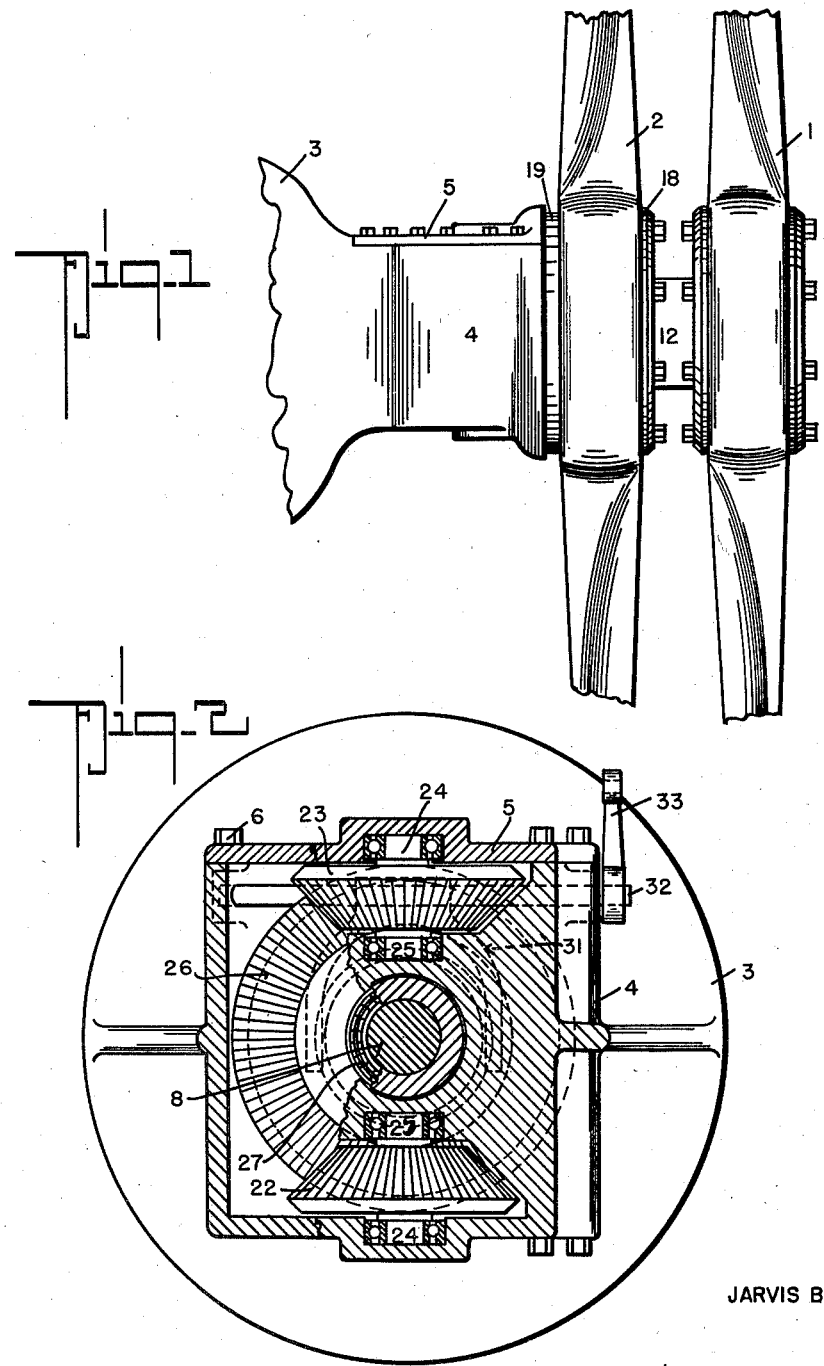
JARVIS B. GILBERT
Inventor
By Herbert E. Smith
Attorney

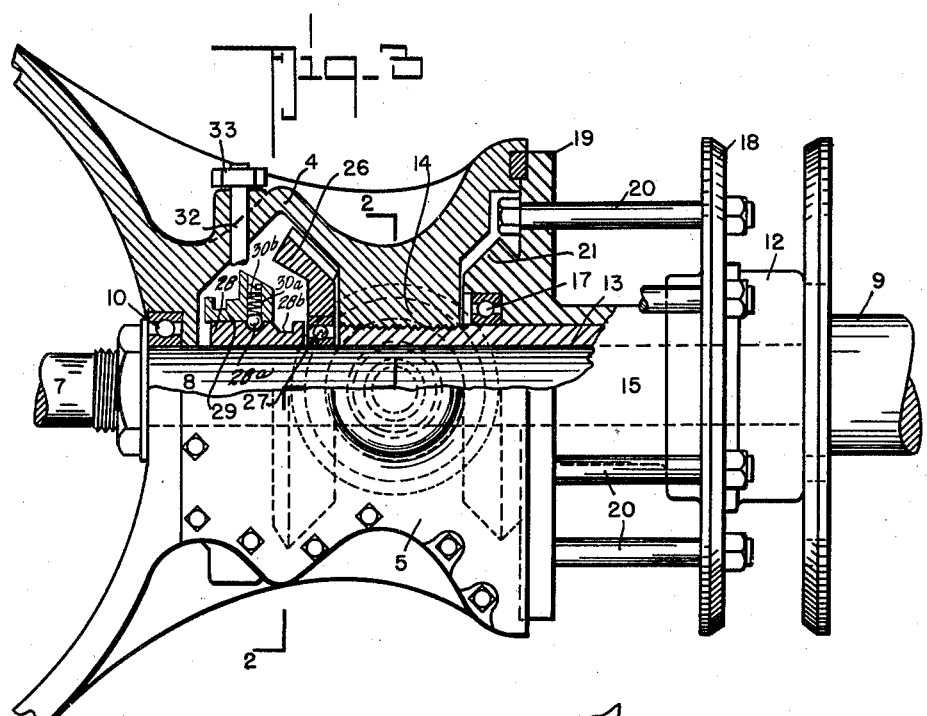
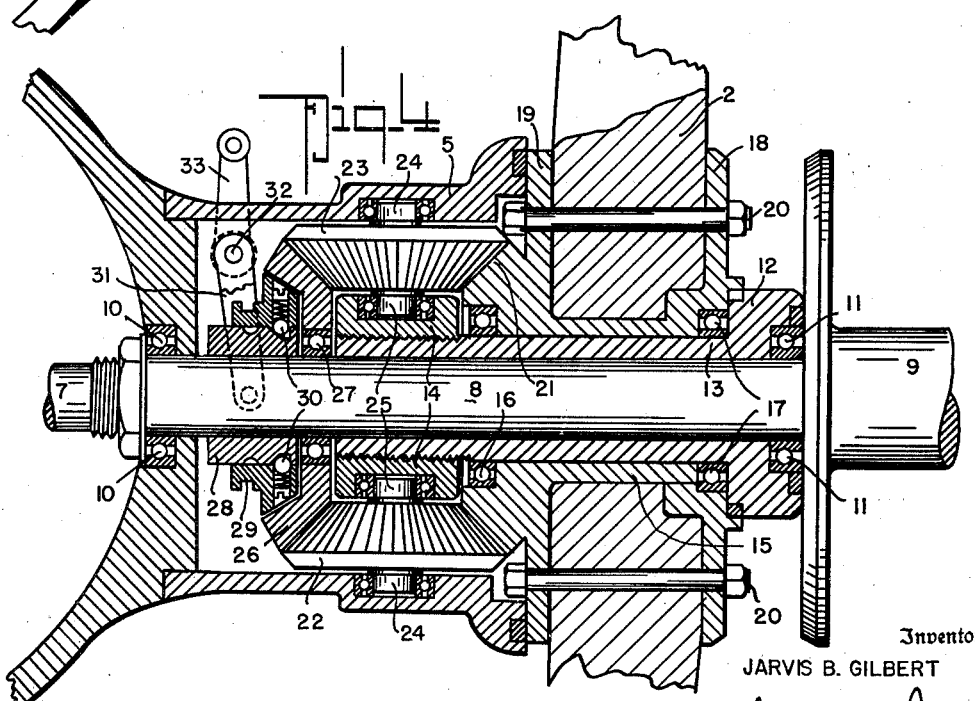

Patented July 16, 1940

2,208,156

UNITED STATES PATENT OFFICE 2,208,156

AIRCRAFT PROPULSION

Jarvis B. Gilbert, Spokane, Wash.

Application May 16, 1938, Serial No. 208,093

2 Claims. (Cl. 170—135.5)

The present invention relates to improvements in aircraft propulsion of the contra-propeller arrangement type in which the two oppositely rotating propellers and the propulsion mechanism are mounted in close proximity, at the nose or prow of the aircraft, in advance of the motor housing. In carrying out my invention I employ a direct drive for the forward of the two propellers, and an indirect drive including planetary gearing for the rear propeller, and clutch means are provided for controlling the operation of the rear propeller.

The propulsion mechanism and the propellers are compactly arranged and mounted at the front of the motor housing, in position for convenient access when repairs, adjustments, or replacements are required, and substantial and wide bearings are provided for the propellers to insure stability against vibrations in the propulsion mechanism, and to provide rigid bearing supports for the revolving parts.

The invention consists in certain novel combinations and arrangements of parts involving the motor housing and a gear casing rigid therewith, and a central interior tubular extension mounted in the casing and forming a journal bearing for the rear propeller, together with differential gearing mounted in the casing and on the extension, and controlling means for the operation of the rear propeller. In the accompanying drawings I have illustrated one complete example of the physical embodiment of my invention wherein the parts are combined and arranged according to one mode I have thus far devised for the practical application of the principles of my invention, but it will be understood that changes and alterations may be made in these exemplifying structures within the scope of my appended claims without departing from the principles of the invention.

Figure 1 is a view in side elevation showing a portion of the motor housing, the gear casing, and the contra-propellers.

Figure 2 is a vertical transverse sectional view at line 2—2 of Figure 3, with some parts of the planetary gearing of the propulsion mechanism in full.

Figure 3 is a top plan view with parts of the gear casing and gearing in section, showing the clutch disengaged and consequently with the rear propeller inoperative or out of commission.

Figure 4 is a longitudinal vertical sectional view through the propulsion mechanism, with the clutch engaged and both propellers in operation.

In order that the general arrangement and relation of parts may readily be understood I have shown in Figure 1 the contra-propellers 1 and 2 of conventional type, a portion of the usual motor housing as 3, and the gear casing 4, which latter may be integral with the motor housing, or rigidly mounted thereon. The open-front casing, which is preferably rectangular in cross section, is provided with a top opening that is closed by a plate 5, and bolted as usual.

The usual crank shaft 7 is fashioned with two rigid extensions, as 8 for the drive shaft, and 9 for the front-propeller shaft, the drive shaft being comparatively long and the propeller shaft 9 being larger in diameter than the drive shaft, but only of sufficient length to mount the front propeller, which is rigidly fixed on the shaft.

The comparatively long driving shaft 8 is journaled at its rear or inner end in bearings 10 of the motor housing, and at its forward end this shaft is journaled in bearings 11 mounted in the enlarged head 12 of a stationary bearing sleeve 13. This sleeve forms an interior tubular extension that is rigidly mounted, as by screw threads, in the gear casing, and it provides a comparatively long sleeve in which the drive shaft is journaled between the widely spaced bearings 10 and 11, to form a stable support for the propulsion mechanism.

The bearing sleeve is threaded externally and screwed rigidly into a complementary yoke 14 that is internally threaded, integral with the side walls of the gear casing, and it extends transversely of the interior of the casing to form a substantial support for the bearing sleeve or tubular extension 13. The bearing sleeve 13 thus forms a rigid longitudinally extending extension rigid with the gear casing and the motor housing or frame 3.

The inner or rear propeller 2 is journaled on the forward end of this tubular extension, and the shaft 8 is journaled within the bearing sleeve, to provide a compact, rigidly supported structure for these journaled parts, and to insure stability and smoothness in the operation of the revolving parts. The rear propeller 2 is fashioned with a hub 15 that is mounted on journal bearings 16 and 17, and these spaced annular ball-bearings are mounted on the periphery of the bearing sleeve at the front and rear of the propeller. The hub 15 is fashioned with integral flanges 18 and 19, for the reception of the blades of the propeller and usual bolts 20 are shown for fastening the blades.

For revolving the rear or inner propeller 2, the flange 19 at its rear face is fashioned with an integral gear ring 21 surrounding the ball bearing 16, and this gear ring meshes with two pinions 22 and 23 journaled in stationary bearings, as 24 mounted in the inner faces of the top and bottom walls of the casing, and bearings 25 mounted in pockets arranged diametrically in the yoke 14.

The two pinions are driven and power is transmitted through the gear ring 21 to the rear propeller from a driving gear ring 26, which is loosely journaled on a ball bearing 27 that is supported on the drive shaft 8 at the rear of the bearing sleeve 13, and this gear ring 26 forms part of a cone clutch which controls the operation of the propeller 2. The driving part of the clutch includes a hub 28 keyed on the shaft 8, and a longitudinally movable clutch disk 29 mounted on the hub, and spring-actuated clutch or cam balls 30 are mounted between the driving disk and the driven member of the cone clutch.

Exterior of the hub 28 are a pair of spaced peripheral grooves 28a and 28b into one of which the balls 30 are adapted to seat in alternate clutch engaging position (Fig. 4) or clutch disengaging position (Fig. 3). When the yoke is moved to alter the clutch position the balls are forced into the passageway 30a against the tension of the spring 30b and are projected by these springs when the balls reach the other groove.

By means of an operating yoke or fork 31 mounted on the rock shaft 32 journaled in the walls of the gear casing near the top thereof, and the clutch lever 33 on this rock shaft, the clutch disk may be shifted into and out of engagement with the cone-face of the gear ring 26, to control the operation of the rear propeller 2.

The forward or front propeller 1 is thus directly driven through the drive shaft 8 and the propeller shaft 9, and the rear propeller 2 is indirectly driven, in the opposite direction, through the arrangement of the driving gear-ring 26 loosely journaled and concentric with the drive shaft, the spaced gear ring 21 rigid with the hub of the propeller 2, and the two intermediate pinions 22 and 23 having fixed bearings rigid with the gear casing and the casing-extension or bearing sleeve.

From this description taken in connection with my drawings, it will be apparent that I have provided a compactly arranged propulsion mechanism, which is simple in construction and operation, occupies a minimum of space, and involves a comparative minimum in added weight for the air-craft, while at the same time this compact arrangement of parts insures stability in the mechanism and the support for the propellers.

Having thus fully described my invention, what I claim as new and desire to secure by Letters Patent is:

1. In aircraft propulsion mechanism involving contra-propeller arrangement, the combination with a gear casing having a rigid interior transverse extending yoke and a bearing sleeve rigidly mounted in said yoke, and projecting forward of said casing, of a drive shaft journaled in said sleeve and a propeller mounted on the end of said shaft, a second propeller journaled on the sleeve and a head on the shaft spacing the propellers—a differential gear train including a driven gear ring on said second propeller, a drive gear ring journaled on said shaft having an exterior frustro-conical depression forming a clutch element, a co-acting frustro-conical clutch element in operative relation with said shaft, and means for operating said second clutch element to and from power transmitting relation with said first clutch element.

2. In aircraft propulsion mechanism involving contra-propeller arrangement, the combination with a gear casing having a rigid interior transversely extending yoke and a bearing sleeve rigidly mounted in said yoke and projecting forward of the casing, of a drive shaft journaled in said sleeve and a propeller mounted on the end of the shaft, a second propeller having a hub journaled on the sleeve and a head on the shaft spacing said propellers, a differential gear train including a driven gear ring on said hub and a drive gear ring journaled on said shaft and having an exterior frustro-conical depression forming one clutch element, a hub rigid with said shaft and having spaced peripheral grooves thereon, a co-acting frustro-conical clutch element on said hub adapted for longitudinal reciprocating movement, spring-pressed balls in said co-acting clutch element adapted for alternate engagement with one of said grooves, and means for reciprocating said co-acting element.

JARVIS B. GILBERT.